United States Patent Office 2,931,032
Patented Mar. 29, 1960

2,931,032

PASSIVE DETECTION AND DIRECTION FINDING APPARATUS AND TARGET DISCRIMINATOR FOR USE THEREIN

Paul D. Newhouse, Linthicum Heights, Md., assignor to Westinghouse Electric Corporation, East Pittsburgh, Pa., a corporation of Pennsylvania Application February 13, 1957, Serial No. 640,051

12 Claims. (Cl. 343—119)

This invention relates to a passive detection system of the type which locates targets by detecting energy pulses transmitted from those targets, and more particularly to means in a passive detection system for selecting a single target from a plurality of targets.

Although not limited thereto, the present invention finds particular application in a passive detection system. As the name implies, passive detection systems have no source of radiant energy themselves but rather utilize a source of radiant energy located elsewhere for obtaining directional information about the source with respect to the location of the passive detection apparatus. Four antennas are used in the passive system, two of the antennas being spaced along a vertical line and the other two being spaced along a horizontal line. By comparing the amplitudes of the energy pulses received by the vertically-spaced antennas, the position of the target in elevation may be determined; and, in a similar manner, the target position in azimuth may be determined by comparing the amplitudes of the pulses received by the horizontally-spaced antennas.

The angular positions of a plurality of radiating objects or targets detected by the passive detection system may be conveniently indicated on a "C type" C.R.T. display tube. However, when it becomes necessary to determine the pulse repetition rate of a particular radiating source or the time required to intercept that source, the pulses from the particular source must be separated from the other pulses and passed individually to pulse analyzing apparatus contained in the passive detection system.

Accordingly, it is a primary object of this invention to provide a target discriminator for a passive detection and direction finding system which will separate energy pulses radiated by a particular source from pulses radiated by other sources and pass the separated pulses to analyzing apparatus.

More generally, an object of the invention is to provide a new and improved passive detection and direction finding system.

Another object of the invention is to provide means for selecting voltage pulses of a predetermined amplitude from a source of pulses of varying amplitudes.

The above and other objects and features of the invention will become apparent from the following detailed description taken in connection with the accompanying drawings which form a part of this specification and in which.

Figure 1:
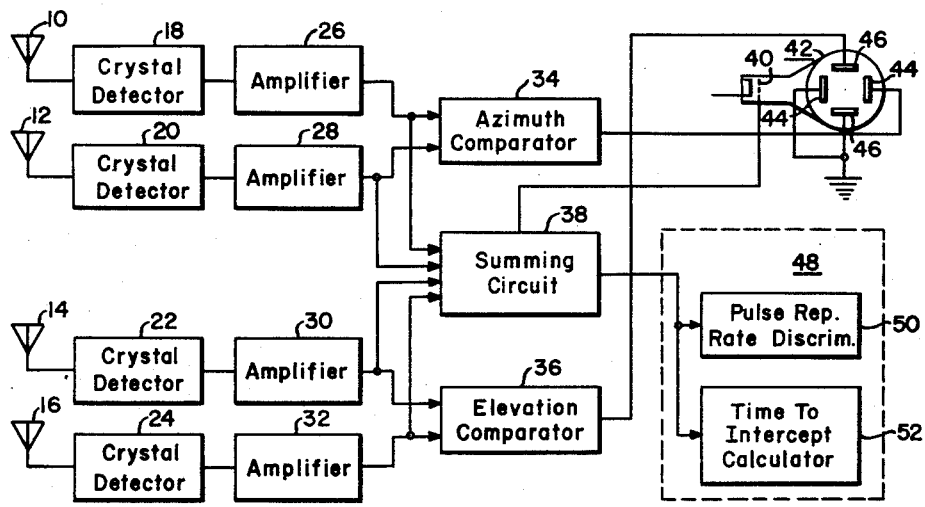
Figure 1 is a block diagram of an overall passive detection and direction finding system.

Referring to Fig. 1, the passive detection and direction finding system shown comprises two antennas 10 and 12 spaced along a horizontal line and two antennas 14 and 16 spaced along a vertical line. The antennas 10 and 12, for example, are spaced apart at equal distances from a common center point and are "aimed" or pointed in slightly divergent directions so that their cone-shaped patterns of response overlap. Any radiating objects in the field formed by the overlapping patterns will send energy pulses to the respective antennas 10 and 12. Unless the object is oriented at equal angles with respect to the two antennas, the amplitudes of the energy pulses arriving at the antennas will be unequal with respect to each other. By comparing the amplitude differences, an angular error signal is derived whose magnitude and polarity indicates the angles of the object relative to the center point or axis of measurement between the antennas. In the case of antennas 10 and 12, the magnitude and polarity of the angular error signal will indicate the position of the radiating object in azimuth; whereas, the angular error signal derived from antennas 14 and 16 will indicate the elevational position of the radiating object.

The apparatus for deriving the aforesaid error signals comprises four crystal detectors 18, 20, 22 and 24, each of which is coupled to an associated one of the antennas 10–16. The detected energy pulses from crystal detectors 18–24 are then fed to four amplifiers 26, 28, 30 and 32, respectively, each of which has the same response. The outputs of amplifiers 26 and 28 are fed, as shown, to an azimuth comparator 34 where the pulses from amplifier 26 are compared in phase opposition with the pulses from amplifier 28 to produce output pulses from comparator 34 equal in amplitude to the difference between the amplitudes of the pulses from the amplifiers 26 and 28. The amplitude and polarity of the pulses from comparator 34 will then indicate the direction of the radiating object from the center line between antennas 10 and 12. In a similar manner, the pulses from amplifiers 30 and 32 are compared in an elevation comparator 36 to produce output pulses, the amplitude and polarity of which indicate the direction of the radiating object in elevation from the center line between antennas 14 and 16.

The outputs of all of the amplifiers 26–32 are also fed to a summing circuit 38 which produces output pulses having an amplitude equal to the sum of the amplitudes of the signals from amplifiers 26–32. The output from summing circuit 38 is then applied as a gating pulse to the intensity grid 40 in a cathode ray tube, generally indicated at 42.

The output of azimuth comparator 34 is applied to the horizontal plates 44 of the cathode ray tube, whereas the output of elevation comparator 36 is applied to the vertical plates 46 of the same tube. In this type of arrangement a display similar to that shown in Fig. 5 will be produced on the face of the cathode ray tube. A target directly in front of the antennas 10–16 will appear in the center of the scope as indicated by target A. Targets located above the axis of measurement will appear on the scope above its midpoint. Thus, both of the targets B and C are located above the axis. Targets to the right of the axis of measurement will appear to the right of the midpoint of the display, such as target C; whereas targets to the left of the system will appear to the left of the midpoint, such as target B.

The output of summing circuit 38 is also applied to pulse analyzing circuits 48 which may include, for example, a pulse repetition rate discriminator shown in block form and designated 50 and a closing time or timeto-intercept calculator shown in block form and designated 52.

Figure 4:
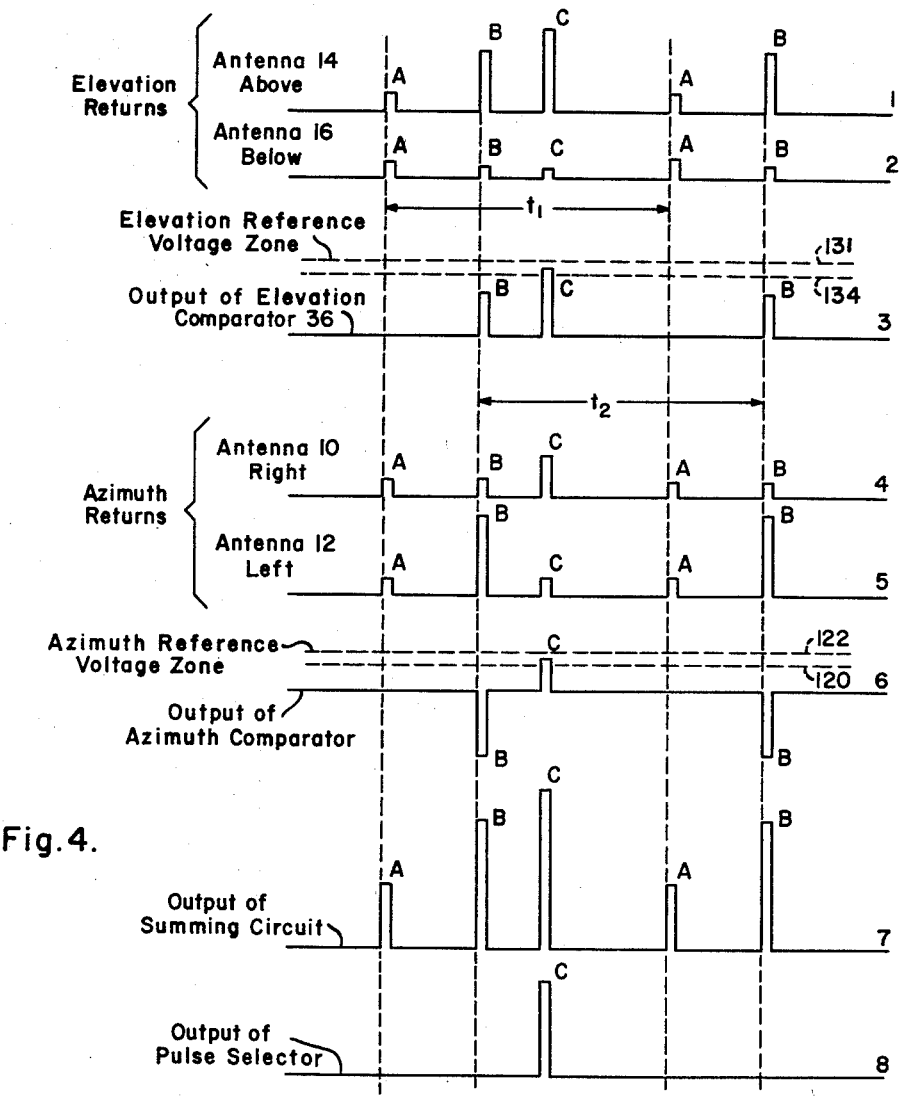
Fig. 4 is a graphical illustration of waveforms appearing at various points in the circuits of Figs. 1 and 3.
Figure 5:
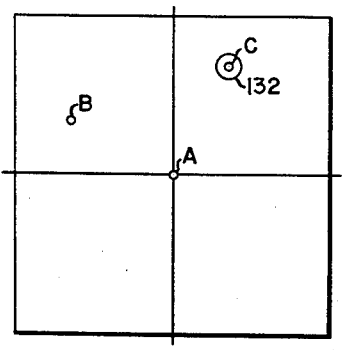
Fig. 5 is an illustration of the indicating screen of a cathode ray tube of the type which may be used in the present invention.

Operation of the system shown in Fig. 1 may best be understood by reference to Fig. 4 where the detected energy pulses received by antennas 14 and 16, respectively, are indicated by the waveforms 1 and 2. The voltage pulses labeled A, B and C are those produced by targets which will appear on the indicating screen of the cathode ray tube 42 as the targets A, B and C shown in Fig. 4. It will be noted that since the object radiating pulses A is directly in front of the passive detection and direction finding system, it produces pulses of the same amplitude in waveforms 1 and 2. However, since the objects radiating pulses B and C lie above the direction finding system, the amplitude of the pulses received by antenna 14 will exceed those received by antenna 16. When the pulses in waveforms 1 and 2 are compared in phase opposition in comparator 36, waveform 3 is produced. Since the pulses from object A are of the same amplitude, they cancel in the comparison process. However, the pulses from objects B and C will produce an output in the comparator which is passed to the vertical deflection plates 46 of the cathode ray tube. Since the output of comparator 34 is greater for object C than for object B, target C is located further from the vertical midpoint of the display screen than target B as shown in Fig. 5.

The detected energy pulses received by antennas 10 and 12 are indicated by waveforms 4 and 5, respectively, in Fig. 4. In this case, the pulses from object A in the respective waveforms are again of the same amplitude since the object is directly in front of the direction finding system. The object radiating pulses B, however, is to the left of the direction finding system since the amplitude of the pulses received by the left antenna 12 are greater than those received by the right antenna 10. The object radiating pulses C, however, is located to the right of the direction finding system since the pulses received by the right antenna 10 are of greater amplitude than those received by the left antenna 12. The output of azimuth comparator 34 is shown by waveform 6. In this case, it will be noted that the resulting pulses from object B have a negative polarity. Consequently, target B on the cathode ray display screen will appear to the left of the horizontal midpoint; whereas, target C, being produced by positive pulses in comparator 34, will appear to the right of the horizontal midpoint.

It is thus apparent that objects lying above the axis of measurement will produce positive output pulses in comparator 36, whereas objects lying below the axis will produce negative output pulses. In a similar manner, objects lying to the right of the axis will produce a positive output from azimuth comparator 34; whereas objects lying to the left will produce negative output pulses.

Figure 2:
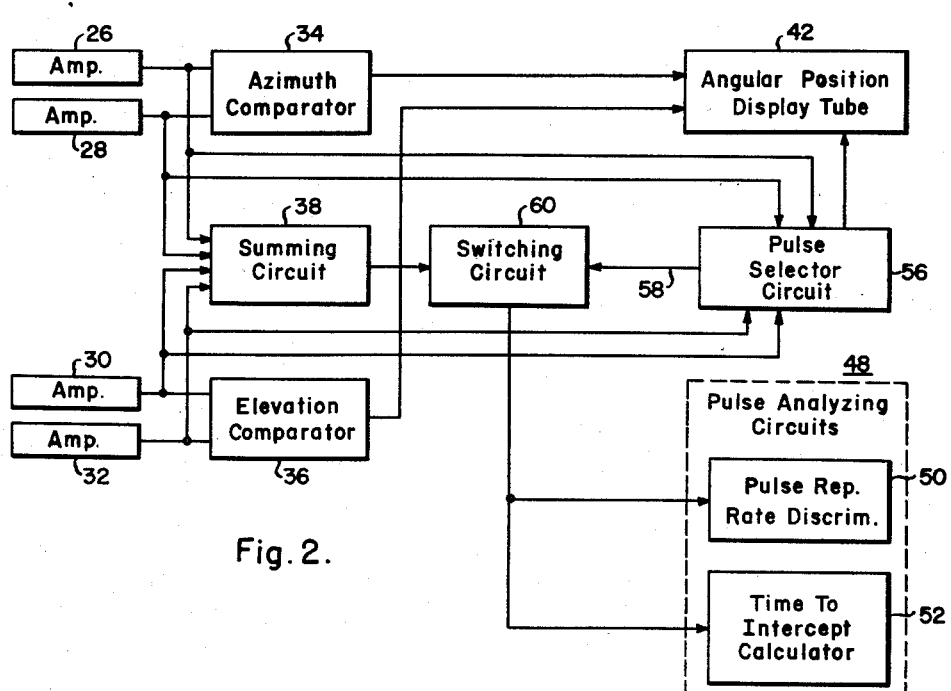
Fig. 2 is a block diagram of a portion of the system shown in Fig. 1 and incorporating the target discriminator of the present invention.

In order for the pulse analyzing circuits 48 to function properly, the voltage pulses produced by a single particular target must be separated from the voltage pulses produced by the other targets. Apparatus for accomplishing this function is shown in block form in Fig. 2 where elements corresponding to similar elements in Fig. 1 are indicated by like reference numerals. Target discrimination is achieved by virtue of the fact that the pulsed outputs from azimuth and elevation comparators will vary in amplitude for different targets. Thus, the outputs of the amplifiers 26–32 are fed to separate azimuth and elevation comparators in a pulse selector 56 which will produce an output pulse on lead 58 only when pulses of a particular amplitude and polarity are fed to it from the amplifiers 26, 28, 30 and 32. Each time pulses of the correct amplitude and polarity are fed to the target discriminator, it produces a gating pulse on lead 58 which enables a switching circuit 60 to pass pulses from the summing circuit 38 to the pulse analyzing circuits 48. In this manner, the switching circuits 60 will pass pulses only when they are of the amplitude and polarity which the pulse selector 56 will pass; and pulses of this particular amplitude and polarity are all received from a single target.

Figure 3:
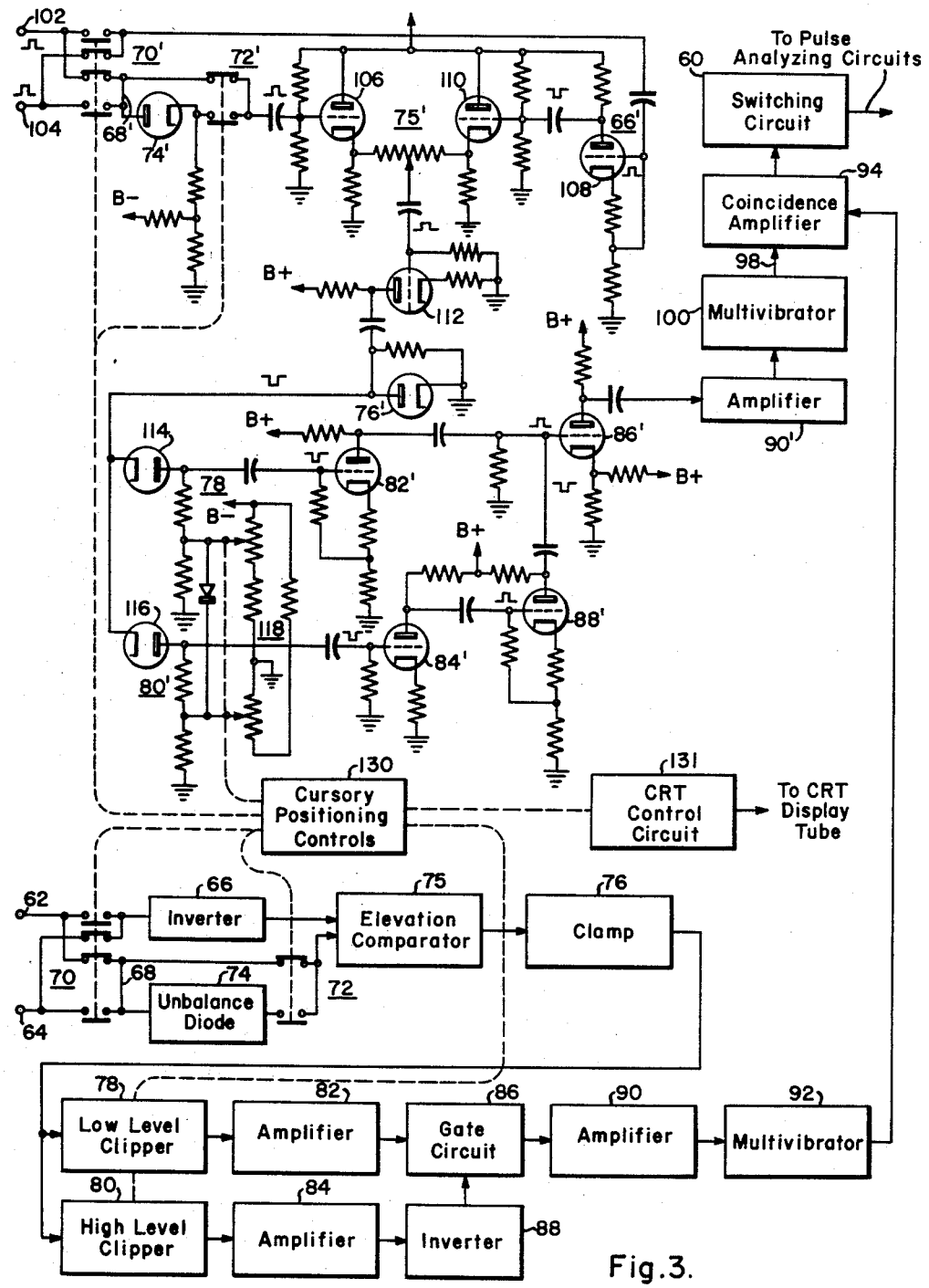
Fig. 3 is a detailed schematic diagram of the target discriminator of the present invention.

The pulse selector 56 is shown in detail in Fig. 3 which is divided into two signal channels, one for azimuth signals and the other for elevation signals. The channel for elevation signals is shown in block form, whereas the channel for azimuth signals is shown as a detailed schematic diagram.

Referring first to the elevation channel, input signals from amplifiers 30 and 32 are applied to input terminals 62 and 64 respectively. The signals on terminal 62 will pass to either an inverter 66 or to lead 68, depending upon the position of the contacts of a polarity reversing switch 70. When the contacts of switch 70 are in the position shown, the signals on terminal 62 will pass to lead 68. However, when the position of the contacts of switch 70 are reversed, the signals on terminal 62 will be fed to inverter 66. With the contacts of switch 70 in the position shown, signals on terminal 64 will be fed to inverter 66; whereas, if the contacts are reversed, they will be fed to lead 68. In any event, signals on terminal 62 will be fed to one of the elements 66 or 68 while signals on terminal 64 will be fed to the other of the elements 66 or 68.

As shown, lead 68 is broken into two parallel current paths, one of which leads directly to an elevation comparator 75 through the normally closed contacts of switch 72, and the other of which passes through an unbalance diode 74 and the normally open contacts of switch 72 to the same elevation comparator 75. The comparator 75 is a separate part of the pulse selector 56 and is not to be confused with comparator 36 shown in Figs. 1 and 2. The output of elevation comparator 75 is then passed through a clamping circuit 76 and fed to two signal channels, one of which includes a low level clipper 78 and the other of which includes a high level clipper 80. The outputs of the clippers are passed through amplifiers 82 and 84 respectively. The output of amplifier 82 is, in turn, fed directly to a gating circuit 86; whereas the output of amplifier 84 is fed to an inverter 88 where it produces a blanking pulse for the gating circuit 86, the arrangement being such that when pulses simultaneously pass through the high and low level clippers, the blanking pulse from inverter 88 will prevent passage of the pulse from amplifier 82 through gating circuit 86. Stated in other words, a signal will be produced at the output of gating circuit 86 when and only when a signal passes through the low level clipper and not the high level clipper. When gating circuit 86 produces an output, it passes through amplifier 90 to trigger a multivibrator 92 which sends a pulse to a coincidence amplifier 94. The coincidence amplifier will produce an output only when a pulse is simultaneously received on leads 96 and 98 from multivibrator 92 and a similar multivibrator 100 in the azimuth channel. This pulse, then, is applied as a gating signal to the switching circuit 60.

Referring now to the azimuth channel, pulses from amplifiers 26 and 28 are applied to input terminals 102 and 104 and passed through a polarity reversing switch 70' similar to the polarity reversing switch 70 found in the elevation channel. All of the elements in the azimuth channel corresponding to those found in the elevation channel are indicated by like primed reference numerals.

Operation of the channel may best be understood by reference to waveforms 4 and 5 in Fig. 4. Waveform 4 is applied to terminal 102 and passes through the polarity reversing switch 70' and the normally closed contacts of switch 72' to the grid of a triode 106 in an azimuth comparator 75'. Waveform 5 passes through the polarity reversing switch to the grid of triode 108 in inverter 66'. The output pulses from inverter 108 as applied to the grid of triode 110 in the comparator 75' then have a negative polarity; whereas the pulses applied to the grid of triode 106 have a positive polarity. Normally, both of the triodes 106 and 110 are conducting in equal amounts so that the voltage at the grid of triode 112 will have a fixed voltage level for the condition when no input signal is received. When the pulses from object C, for example, are applied to terminals 102 and 104, the pulse in waveform 5 on terminal 104 will be inverted by inverter 66' and applied to the grid of triode 110. The pulse in waveform 4 on terminal 102, however, will be applied directly to the grid of triode 106 with a positive polarity. Under these conditions, there will be differential conduction in the triodes 106 and 110, the triode 106 conducting more heavily than triode 110. The rise in the cathode potential of triode 106 exceeds the decrease in the potential on the cathode of triode 110; and, thus, a positive pulse is applied to the grid of triode 112. Triode 112, in turn, produces a negative output pulse which is applied to the cathodes of the diodes 114 and 116 in the clippers 78' and 80' respectively. The bias on the anodes of diodes 114 and 116 is adjusted by a voltage divider arrangement generally indicated at 118. In Fig. 4, the signal applied to the cathodes of diodes 114 and 116 will be similar to waveform 6 except that all of the pulses will be of one polarity. The voltage level established by divider 118 on the diode 114 is indicated by the dotted line 120; whereas, the voltage level established on the anode of diode 116 is indicated by the dotted line 122. Thus, voltage pulses of amplitude below the voltage represented by line 120 will not pass through either of the diodes 114 or 116; whereas voltage pulses such as those from object C which are above the voltage level shown by line 120 but below the voltage level represented by line 122 will pass through diode 114 but not diode 116, and will be amplified in amplifier 82' and passed through gate circuit 86' to amplifier 90' and multivibrator 100. If the amplitude of the pulse is such that it will pass through both of the diodes 114 and 116, that passing through diode 116 will be amplified in the amplifier 84', inverted in inverter 88', and applied to the grid of the triode in gating circuit 86' with a negative polarity. Thus, if the signal passes through both of the diodes 114 and 116, the negative pulse from inverter 88' will cancel that from amplifier 82' and there will be an absence of an output pulse from amplifier 90'.

It will be apparent that in order for the pulses from comparator 75' to pass through diodes 114 and 116, they must be of a negative polarity. This means, in effect, that the negative signal applied to the grid of triode 110 must never exceed the positive signal applied to the grid of triode 106. When the radiating object is to the right of the passive detection and direction finding apparatus, the signals on terminal 102 will exceed those on terminal 104 and, accordingly, signals on terminal 102 must be fed to the grid of triode 106 as shown in the drawing. On the other hand, when the radiating object is to the left of the passive direction finding apparatus, the signals on terminal 104 will exceed those on terminal 102; and, accordingly, the switch 70' must be actuated to reverse the position of its contacts with respect to those shown in the drawing so that the pulses on terminal 104 will pass to the grid of triode 106 and the smaller pulses on terminal 102 will pass to the grid of triode 108.

Operation of switches 70 and 70', and the position of the voltage divider 118 in the high and low level clippers is controlled by cursor positioning controls, generally indicated at 130. These cursor controls also control operation of a C.R.T. control circuit 131 which positions a circular trace 132 on the face of the cathode ray tube shown in Fig. 5. An operator manually positions the cursor controls so that the circular trace moves to the right or left of the center point of the screen or above or below the center point to bracket a particular target. As the circular trace is moved on the face of the cathode ray tube, the positions of voltage dividers 118 and switches 70 and 70' are also varied. As the circular trace is moved to the right or left, the voltage reference levels represented by lines 120 and 122 on the high and low level clippers are moved upward from the zero voltage level. In a similar manner, as the circular trace is moved upward or downward from the center of the display, the cursor positioning controls will adjust voltage dividers 118 to move the reference voltages indicated by the lines 131 and 134 in Fig. 4 upward. Whenever the circular trace is moved to the right of the center of the display to bracket the target, the pulses received by antenna 10 on terminal 102 will exceed those received by antenna 12 on terminal 104; and, accordingly, the cursor positioning controls 130 will position the contacts of switch 70' so that the pulses from antenna 10 are fed to triode 106 in comparator 36'. This position of the contacts is that shown in Fig. 3. When the cursor moves to the left of the center line, however, the pulses from antenna 12 on terminal 104 will exceed those from antenna 10 on terminal 104 and accordingly, switch 70' is reversed to apply the pulses from antenna 12 to the grid of triode 106.

As the signal representing the desired target approaches the zero axis in azimuth, the pulse outputs on leads 102 and 104 approach zero amplitude with the result that the useful output of pulse comparator 75' approaches zero. Accordingly, the cursor control 130 causes the unbalance tube 74' to be switched into the circuit within a limited range on either side of the zero position to thereby provide a pulse output of sufficient amplitude from 75' to result in a useful signal on lead 98 to the coincidence amplifier 94. For example, if the target C moved to the left as viewed in Fig. 5 and the operator kept the cursor on this target, at about +2 degrees the cursor positioning controls 130 would move the contacts of switch 72' upward; at zero degree the contacts of switch 70' would be moved upward; and at −2 degrees the contacts of switch 72' would be moved downward into the position shown. In this manner, the unbalance tubes 74 and 74' insure that pulses will be on leads 98 and 94, and the pulse selector circuit 56 will open switching device 60 when the target is directly on the axis of measurement.

In a similar manner, the switch 70 in the elevation channel is controlled by the cursor controls 130 to insure that the polarity of the output from elevation comparator 75 will always be negative.

If it is assumed, for example, that the cursor positioning controls are adjusted so that the circular trace 132 brackets target C in Fig. 5, the voltage divider 118 in the azimuth channel will be adjusted so that the voltages established on the anodes of diodes 114 and 116 are represented by the lines 120 and 122 respectively in Fig. 4. At the same time, the voltage divider, not shown, in clippers 78 and 80 in the elevation channel will be adjusted so that the voltages on the anodes of the diodes in these clippers are represented by the lines 132 and 134 in Fig. 4. Since, during this time, the signals received by antenna 10 on terminal 102 are greater than those received by antenna 14 on terminal 104, the cursor positioning control adjusts switch 70' in the azimuth channel so that the larger returns from the antenna 10 are passed to the grid of triode 106. The signals received by antenna 14 on terminal 62 will be larger than those received by antenna 16 on terminal 64, and accordingly signals on terminal 62 in the elevation channel are applied directly to the grid of one of the triodes in the elevation comparator 75 while the other signal is inverted and applied to the other triode in the comparator 75.

Under the conditions just described, the azimuth channel will pass only those signals having an amplitude somewhere between the voltage levels 122 and 120; and the elevation channel will pass only signals having an amplitude between the voltage levels represented by the lines 132 and 134. As will be understood, only those signals at the output of the azimuth and elevation comparators in discriminator 56 from object C will lie in these voltage reference zones and be passed to the coincidence amplifier 94 where they produce a gate which actuates the switching circuit 60. This is shown in Fig. 4 where the waveform 8 represents the output of the target discriminator as applied to switching circuit 60. As will be understood, the switching circuit 60 will pass a signal only upon coincidence of a pulse in waveform 7 with a pulse in waveform 8. Consequently, only the signals from object C will be passed to the pulse analyzing circuit 48.

If the cursor positioning controls 130 are adjusted so that the circular trace 132 brackets target B, the elevation reference voltage zone will be lowered to the amplitude of pulses B shown in waveform 3. Also, the azimuth reference voltage zone will be shifted until it is in the range of the amplitude of the pulses B shown in waveform 6. The azimuth reference voltage does not change polarity, however, since when the circular trace 132 is shifted to the left of the midpoint of the display, the switch 70' will be actuated to reverse the position of its contacts. This has the effect of inverting the waveform 6 at the output of comparator 75'. Under this latter set of conditions, an output pulse will be produced in coincidence amplifier 94 only upon reception of a pulse or of pulses from object B while excluding all other signals.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In a passive detection and direction finding system of the type in which target aspect is determined by comparing the amplitudes of energy pulses received by spaced antennas, the combination of means for detecting said energy pulses, means for comparing the detected energy pulses received by two of said antennas in phase opposition, a pair of signal channels connected to the output of said comparing means, a clipper in one of said channels for passing signals above a first predetermined amplitude, a clipper in the other of said channels for passing signals above a second predetermined amplitude, a gate circuit connected to the output of one of said clippers, and means for applying the output of the other of said clippers to said gate circuit as a blanking signal whereby signals from said one clipper will pass through the gate circuit only in the absence of a blanking signal from said other clipper.

2. In a passive detection and direction finding system of the type in which target aspect is determined by comparing the amplitudes of energy pulses received by spaced antennas the combination of means for detecting said energy pulses means for comparing the detected energy pulses received by two of said antennas in phase opposition to produce a resultant pulse having an amplitude proportional to the difference in amplitude between the detected energy pulses from said two antennas, a pair of signal channels connected to the output of said comparing means, means in one of said channels for passing signals above a first predetermined amplitude, means in the other of said channels for passing signals above a second predetermined amplitude which is higher than said first predetermined amplitude, a gate circuit connected to the output of said one channel, and means for applying the output of said other channel to said gate circuit as a blanking signal whereby signals from said one channel will pass through the gate circuit only in the absence of a blanking signal from said other channel.

3. In a passive detection and direction finding system of the type in which target aspect is determined by comparing the amplitudes of energy pulses received by spaced antennas, the combination of means for detecting said energy pulses, means for comparing the detected energy pulses received by two of said antennas in phase opposition, a pair of signal channels connected to the output of said comparing means, means in one of said channels for passing signals above a first predetermined amplitude, means in the other of said channels for passing signals above a second predetermined amplitude, and a gate circuit connected to the outputs of said channels for eliminating signals other than those having an amplitude above the first predetermined amplitude and below the second predetermined amplitude.

4. In a passive detection and direction finding system of the type in which target aspect is determined by comparing the amplitudes of energy pulses received by spaced antennas, the combination of means for detecting said energy pulses, means for comparing the detected pulses received by two of said antennas in phase opposition, a pair of signal channels connected to the output of said comparing means, and means in said signal channels for eliminating signals other than those having an amplitude above a first predetermined amplitude and below a second predetermined amplitude.

5. In a passive detection and direction finding system of the type in which target aspect is determined by comparing the amplitudes of energy pulses received by spaced antennas, the combination of means for detecting said energy pulses, means for comparing the detected pulses received by two of said antennas in phase opposition, and means connected to the output of said comparing means for eliminating signals other than those having an amplitude above a first predetermined amplitude and below a second predetermined amplitude.

6. In a passive detection and direction finding system of the type in which target aspect in azimuth is determined by comparing the amplitudes of energy pulses received by a first pair of spaced antennas and target aspect in elevation is determined by comparing the amplitudes of energy pulses received by a second pair of spaced antennas, the combination of means for detecting said energy pulses, means for combining the detected energy pulses received by the respective antennas, first means for comparing the detected energy pulses received by said first pair of antennas in phase opposition, a first pair of signal channels connected to the output of said first comparing means, a device in one of said first pair of channels producing an output in response to signals above a first predetermined amplitude, a device in the other of said first pair of channels for producing an output in response to signals above a second predetermined amplitude, a first gate circuit connected to the outputs of said first pair of channels for eliminating signals other than those having an amplitude above the first predetermined amplitude and below the second predetermined amplitude, second means for comparing the detected energy pulses received by said second pair of antennas in phase opposition, a second pair of signal channels connected to the output of said second comparing means, a device in one of said second pair of channels for producing an output in response to signals above a third predetermined amplitude, a device in the other of said second pair of channels for producing an output in response to signals above a fourth predetermined amplitude, a second gate circuit connected to the outputs of said second pair of channels for eliminating signals other than those having an amplitude above the third predetermined amplitude and below the fourth predetermined amplitude, apparatus connected to the outputs of said first and second gate circuits for producing an output pulse upon coincidence of a pulse from said first gate circuit with a pulse from said second gate circuit, and a switch device connected to said apparatus and said combining means for passing a pulse from said combining means upon coincidence of a pulse from the combining means with a pulse from said apparatus.

7. In a passive detection and direction finding system of the type in which target aspect in azimuth is determined by comparing the amplitudes of energy pulses received by a first pair of spaced antennas and target aspect in elevation is determined by comparing the amplitudes of energy pulses received by a second pair of spaced antennas, the combination of means for detecting said energy pulses, means for combining the detected energy pulses received by the respective antennas, first means for comparing the detected energy pulses received by said first pair of antennas in phase opposition, second means for comparing the detected energy pulses received by said second pair of antennas in phase opposition, a first device connected to the output of said first combining means for selecting pulses of a predetermined amplitude, a second device connected to the output of the second combining means for selecting pulses of a second predetermined amplitude, apparatus connected to the outputs of said devices for producing an output pulse upon coincidence of a pulse from said first device with a pulse from said second device, and a switch device connected to said apparatus and said combining means for passing a pulse from the combining means upon coincidence of a pulse from said combining means with a pulse from said apparatus.

8. In a passive detection and direction finding system of the type in which target aspect in azimuth is determined by comparing the amplitudes of energy pulses received by a first pair of spaced antennas and target aspect in elevation is determined by comparing the amplitudes of energy pulses received by a second pair of spaced antennas, the combination of means for detecting said energy pulses, means for combining the detected energy pulses received by the respective antennas, first means responsive to the detected pulses from said first pair of antennas for producing a signal having a characteristic which is proportional to the azimuth position of a target, second means responsive to the detected pulses from said second pair of antennas for producing a signal having a characteristic which is proportional to the elevational position of a target, a first device connected to the output of said first means for selecting pulses having a first predetermined characteristic, a second device connected to the output of the second combining means for selecting pulses having a second predetermined characteristic, apparatus connected to the outputs of said devices for producing an output pulse upon coincidence of a pulse from said first device with a pulse from said second device, and a switch device connected to said apparatus and said combining means for passing a pulse from said combining means upon coincidence of a pulse from said combining means with a pulse from said apparatus.

9. Apparatus for selecting pulses of a predetermined amplitude from a source of pulses of varying amplitudes comprising, in combination, a pair of signal channels connected to said source of pulses, a clipper in one of said channels for passing pulses having an amplitude above a first predetermined amplitude, a clipper in the other of said channels for passing pulses having an amplitude above a second predetermined amplitude which is greater than said first predetermined amplitude, and a gate circuit connected to the outputs of said clippers for eliminating signals other than those having an amplitude above said first predetermined amplitude and below the second predetermined amplitude.

10. Apparatus for selecting pulses of a predetermined amplitude from a source of pulses of varying amplitudes comprising, in combination, a pair of signal channels connected to said source of pulses, means in one of said channels for eliminating signals other than those having an amplitude above a first predetermined amplitude, means in the other of said channels for eliminating pulses having an amplitude below a second predetermined amplitude, and a gate circuit connected to the outputs of said channels for eliminating signals other than those having an amplitude above said first predetermined amplitude and below the second predetermined amplitude.

11. Apparatus for selecting pulses of a predetermined amplitude from a source of pulses of varying amplitudes comprising, in combination, a pair of signal channels connected to said source of pulses, means in one of said channels for eliminating signals other than those having an amplitude above a first predetermined amplitude, means in the other of said channels for eliminating pulses having an amplitude below a second predetermined amplitude, a gate circuit connected to the output of one of said channels, and means for applying the output of the other of said channels to said gate circuit as a blanking pulse whereby signals from said one channel will pass through the gate circuit only in the absence of a blanking pulse from said other channel.

12. Apparatus for selecting pulses of a predetermined amplitude from a source of pulses of varying amplitudes comprising, in combination, a pair of signal channels connected to said source of pulses, a clipper in one of said channels for passing pulses having an amplitude above a first predetermined amplitude, a clipper in the other of said channels for passing pulses having an amplitude above a second predetermined amplitude which is greater than said first predetermined amplitude, means for reversing the polarity of pulses from the clipper in said other channel, an electron discharge device having at least one grid included therein, means for applying pulses from the clipper in said one channel to said grid, and means for applying the pulses from said reversing means to said grid whereby a pulse from said reversing means will substantially cancel a pulse from the clipper in said one channel on said grid.

No references cited.